United States Patent [19]

Ozawa et al.

[11] Patent Number: 4,952,971
[45] Date of Patent: Aug. 28, 1990

[54] AUTOFOCUSING APPARATUS FOR PHOTOGRAPHIC PRINTER

[75] Inventors: Yoshio Ozawa; Takashi Yamamoto; Takao Shigaki, all of Kanagawa, Japan

[73] Assignee: Fuji Photo Film Co., Ltd., Kanagawa, Japan

[21] Appl. No.: 304,629

[22] Filed: Feb. 1, 1989

[30] Foreign Application Priority Data

Feb. 5, 1988 [JP] Japan .................. 63-25512

[51] Int. Cl.⁵ .......................................... G03B 27/32
[52] U.S. Cl. ...................................... 355/56
[58] Field of Search ............... 355/56, 40; 354/400, 354/402

[56] References Cited

U.S. PATENT DOCUMENTS

| | | | |
|---|---|---|---|
| 2,501,462 | 3/1950 | Zbell | 354/402 X |
| 3,511,565 | 5/1970 | Harman et al. | 355/56 |
| 4,136,821 | 1/1979 | Sugiura et al. | 354/402 X |
| 4,779,122 | 10/1988 | Signoretto | 355/40 X |

FOREIGN PATENT DOCUMENTS

| | | | |
|---|---|---|---|
| 57-207236 | 6/1981 | Japan . | |
| 207236 | 12/1982 | Japan | 355/56 |
| 19936 | 2/1984 | Japan | 355/56 |
| 50433 | 3/1984 | Japan | 355/56 |
| 23031 | 1/1987 | Japan | 355/56 |
| 2070263 | 9/1981 | United Kingdom | 355/56 |

OTHER PUBLICATIONS

Leica Fotografie, vol. 7, 1982, 354-402.
The Autofocus Device, K-H Weicker, p. 25.

*Primary Examiner*—Donald A. Griffin
*Attorney, Agent, or Firm*—Sughrue, Mion, Zinn, Macpeak & Seas

[57] ABSTRACT

An autofocusing apparatus suitable for use in a photographic printer is provided. The printer permits mounting of plural carriers for holding original films of different sizes thereon respectively and is capable of setting a focusing position on the basis of an AF curve determined when a reference carrier out of a plurality of carriers is mounted. The apparatus is also so constructed that the AF curve is compensated based on differences between the position of the original film upon mounting of the reference carrier and that of the original film upon mounting another carrier. Accordingly, an original film can be positioned at its optimal focusing position regardless of which of the plurality of carriers is used.

14 Claims, 4 Drawing Sheets

F I G. 3
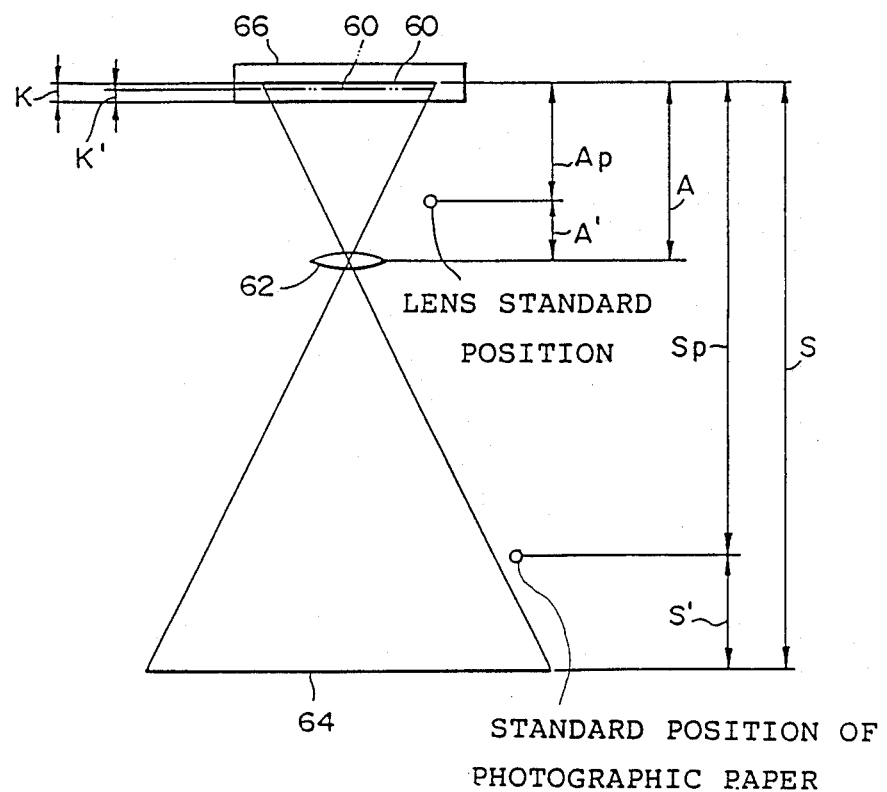

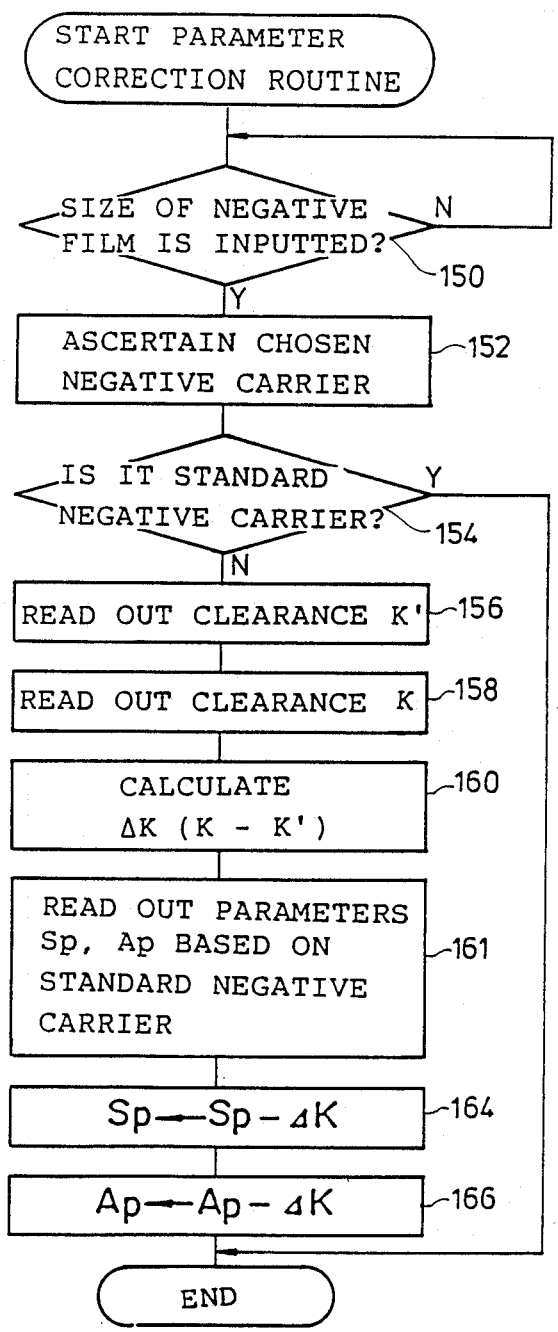

AUTOFOCUSING APPARATUS FOR PHOTOGRAPHIC PRINTER

BACKGROUND OF THE INVENTION

1. Field of the Invention:

This invention relates to an autofocusing apparatus for a photographic printer, and more particularly to an autofocusing apparatus suitable for use in a photographic printer which allows a focusing position to be set on the basis of an AF curve determined from the characteristics of a reference film carrier.

2. Description of the Related Art:

Photographic films come in a number of sizes e.g. 110 type, 135 type, Brownie type. Further, the photographic films of the 135 type come in full-size frame format and half-size frame format. To permit the use of photographic films in such varied sizes, some current printers enable variation in printing size and enlargement magnification by movement of the lens. In addition, they also enable variation in the length of an optical path that is the conjugate length of the optical path for printing. The amount of movement of the lens and of the conjugate length can be determined by an AF curve. The method of determination will be described hereinafter. FIG. 3 is a schematic of a printer. A negative film 60 held in a negative carrier 66 is illuminated by an unillustrated light source. The light thus transmitted passes through a lens 62 to illuminate a photographic paper 64, thereby enabling an image to be recorded. Here, the following equation can be established as a first lens formula:

$$\frac{1}{A} + \frac{1}{S - A} = \frac{1}{f} \qquad \text{Equation (1)}$$

where
A is distance between the lens and the negative film,
S is conjugate length
f is focal length of the lens.

Next, when a magnification $m_1$ is specified and the focal point is adjusted by $m_1$, the following equation is derived from Equation (1):

$$\frac{1}{A_p + A'm_1} + \frac{1}{S_p + S'm_1 - (A_p + A'm_1)} = \frac{1}{f} \qquad \text{Equation (2)}$$

Further, when a magnification $m_2$ is specified and the focal point is adjusted, the following equation is derived in the same manner as Equation 2:

$$\frac{1}{A_p + A'm_2} + \frac{1}{S_p + S'm_2 - (A_p + A'm_2)} = \frac{1}{f} \qquad \text{Equation (3)}$$

where
$A_P$ is distance between the standard position of the lens and the negative film, which serves as a compensation value,
A' is distance between the standard position of the lens and the actual lens position,
$S_P$ is distance between the standard position of the photographic paper and the negative film, which serves as a compensation value,
S' is distance between the standard position of the photographic paper and the actual position of the photographic paper,
$A'm$, $S'm_1$ are A' and S' when the magnification is $m_1$ and
$A'm_2$, $Sm_2$ are A' and S' when the magnification is $m_2$.

Incidentally, A' and S' are values obtained by measuring actual distances for example, by measuring the number of pulses from a pulse motor. $A_P$, and $S_P$ are values calculated on the assumption that the above equation (1) is established when focusing is adjusted.

Since $A'm_1$, $S'm_1$, $A'm_2$ and $S'm_2$ are respectively the distances relative to each standard position their values are known. Further, since the focal length is determined by the lens, $A_P$ and $S_P$ can be determined by the above-described equations (2) and (3). As will be understood from the next equation, either $A_P$ or $S_P$ can easily be calculated, once the other is determined:

$$\frac{1}{A_p + A'} + \frac{1}{S_P + S' - (A_P + A')} = \frac{1}{f} \qquad \text{Equation (4)}$$

Incidentally, it is essential to provide precise focusing and magnification in general printers. A practical printing operation therefore needs to obtain similarly precise focusing by inputting a desired magnification.

Namely, focusing is considered to be adequate so long as sharpness is within a certain tolerance. However, since the magnification can vary within the range able to be focused, it is necessary to provide compensation throughout the range of variation.

Accordingly, A' and S' under a predetermined magnification will be determined in accordance with the following procedure.

First the following equation can be established as a second lens formula:

$$\frac{S - A}{A} = m \qquad \text{Equation (5)}$$

Here, Am and Sm are determined from the following equations in the same manner as in the above-described focusing:

$$\frac{Sm + S'm_1 - (Am + A'm_1)}{Am + A'm_1} = m_1 \qquad \text{Equation (6)}$$

$$\frac{Sm + S'm_2 - (Am + A'm_2)}{Am + A'm_2} = m_2 \qquad \text{Equation (7)}$$

Since Am and Sm can be determined by the equations (6) and (7), either Am or Sm can be calculated by the following equation once the other is determined:

$$\frac{Sm + S' - (Am + A')}{Am + A'} = m \qquad \text{(Equation 8)}$$

A' and S' are determined by a simultaneous equation composed of equation (8) and the aforementioned equation (4).

If optimal $A_P$, $S_P$, Am and Sm are determined by repeating the above focusing operation and then stored in a memory of a control unit, A' and S', which permit focusing at a magnification m, can be easily determined by inputting the magnification.

In a method such as that described above, when the position of the negative film 60 is shifted, as seen in an imaginary line of FIG. 3, each parameter varies. In other words, a difference K−K' occurs using as a standard level a low face of the negative carrier 66 as viewed in FIG. 3, so that the preciseness of A' and S' cannot be obtained. The position of the negative film 60 varies when the negative carrier 66, adapted to hold the negative film 60, is replaced with another in accordance with the size of the negative film 60. Namely, this is caused by variations in dimension produced by machining of the negative carriers. In addition, the position of the negative film does not vary in practice. However, in case that a negative carrier is used in which glass has been incorporated in an opening where the negative film is disposed, the length of the optical path of the transmitted light is changed by the glass, leading to the same result as the position of the negative film is changed. An example of a similar cause of variations in the precise position of the negative film is where another negative carrier — different from a negative carrier applied when an AF curve has been determined — is employed.

SUMMARY OF THE INVENTION

With the foregoing in view, it is a principal object of the present invention to provide an autofocusing apparatus which permits positioning at an optimal focusing position even when a carrier such as a negative carrier adapted to hold an unexposed film is replaced with another.

In one aspect of this invention, there is provided an autofocusing apparatus suitable for use in an upright photographic printer of the type in which upon changing an enlargement, the conjugate length is altered by changing the position of an original film, and the position of a lens for printing is also changed when the enlarging magnification is changed. The autofocusing apparatus permits the mounting of a plurality of carriers for holding films of different sizes thereon, respectively, and is able to set a focusing position on the basis of an AF curve determined when a standard carrier is mounted. The autofocusing apparatus comprises:

means for setting compensation values for individual carriers, respectively, the compensation values being commensurate with differences between the positions of a film in individual carriers other than the standard carrier and the position of the film upon mounting of the standard carrier on a head;

means for identifying the mounted carrier; and means for compensating the AF curve on the basis of a compensating value corresponding to the carrier specified by the identifying means.

Original films are generally provided in various sizes. A desired carrier, for each size of film suited for that film and employed in print processing, is selected from a plurality of carriers. Although the position where each original film is held by means of its corresponding carrier may preferably be constant even when any one of several carriers is applied, displacement in position of each original film for the individual carriers occurs owing to variations in dimension or the like produced by machining of each carrier. An appropriate focusing may not be performed in some instances due to the above-mentioned displacement even when the original film is positioned at the most suitable focusing position on the basis of the AF curve.

In the present invention, any compensating value for the individual carriers determined based on the differences between the position of the film upon mounting of each carrier other than the standard carrier and that of the original film upon mounting of the standard carrier is set by the setting means. Further, each carrier, which is mounted on the head, is specified by the identification means at the start of print processing, and the AF curve is corrected on the basis of the compensation value corresponding to the carrier which has been specified by said identification means. The positioning of the film based on the AF curve can thus be conducted precisely.

As has been described above, the present invention has therefore brought about such excellent advantageous effects that the autofocusing apparatus for the printer permits positioning at the optimal focusing position even when the carrier such as the negative carrier capable of holding the film is replaced with another.

BRIEF DESCRIPTION OF THE DRAWINGS

The above and other objects, features and advantages of the present invention will become apparent from the following description and appended claims, taken in conjunction with the accompanying drawings, in which:

FIG. 3 is a schematic view of a printer illustrating operations during focusing adjustment; and FIG. 4 is a flow chart showing a parameter correction routine based on a positional displacement of a negative film.

DETAILED DESCRIPTION OF THE INVENTION AND PREFERRED EMBODIMENTS

Figure 1:
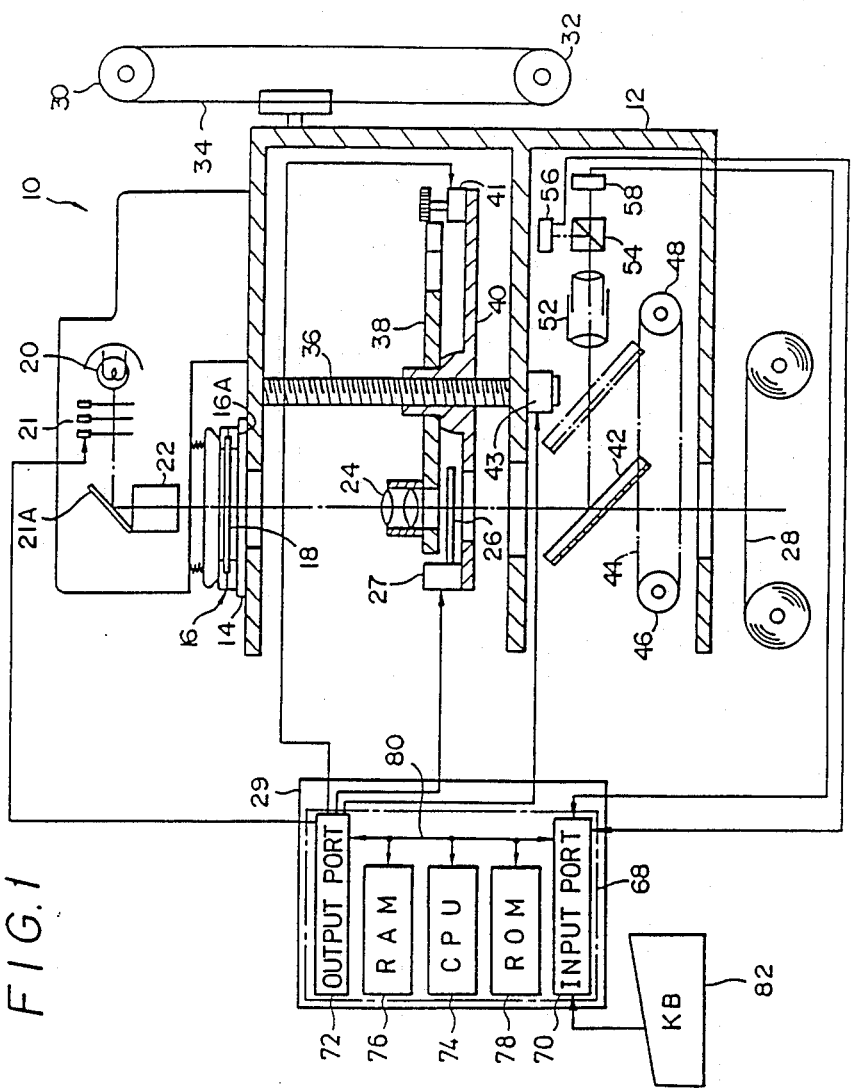
FIG. 1 is a block diagram of a printer to which this invention has been applied.

FIG. 1 illustrates an upright photographic printer 10 to which the present invention is applied. A housing 12 used for a movable base is so constructed that a negative carrier 16 is mounted on a base plate 14, and a negative film 18 is loaded into the negative carrier 16.

A light source 20, a YMC filter 21, a mirror 21A and a light diffusion drum 22 are provided coaxially with the corresponding negative carrier 16 on the housing 12. A printing light is transmitted to a photographic paper 28 through a lens 24 and a shutter 26. The actuation of the shutter 26 is controlled by a signal from a controller 29 through a driver 27. Incidentally, the action of advancing or retracting the YMC filter along an optical axis is also controlled by a signal from the controller 29.

The controller 29 includes a microcomputer 68, which consists of an input port 70, an output port 72, CPU 74, RAM 76, ROM 78 and buses 80 such as a data bus and a control bus by which these members are connected. A keyboard 82 is connected to the input port 70 of the controller 29. Magnification, frame sizes of the negative film, etc. can be inputted by pressing keys on the keyboard.

When each negative film 18 is of a different frame size, each negative carrier 16 must be changed correspondingly. Therefore, each negative carrier 16 is formed with an unillustrated opening corresponding to the size of each negative film and the carrier. Thus, a plurality of carriers is formed.

The negative film 18 is usually held between a pair of plate-shaped surfaces of the negative carrier 16. Although it is preferable, for example, for clearance between a lower surface 16A of the negative carrier 16 and the negative film to be constant, the clearance may be varied depending on each negative carrier because of variations in dimensions by the machining of the negative carrier 16. Such a dimension al difference causes each parameter described in the paragraph on the prior art as viewed in FIG. 3 to produce errors. Therefore, in the present embodiment, the, clearances for individual negative carriers are determined in advance and stored in RAM 76 of the microcomputer 68.

In such a case, the negative carrier 16 serving as the standard negative carrier, which perhaps ideally should be a standard-size negative carrier, is established from of a plurality of negative carriers. The standard negative carrier 16 is mounted in position to determine an AF curve. The method of determining the AF curve will be described below. Namely, the dimensional difference of the standard negative carrier 16 is reduced to 0.

The selection of the negative carrier to be mounted is performed by inputting a desired frame size of a negative film using the keyboard 82. Namely, this input operation permits selection of the negative carrier. When clearance of the negative carrier to be mounted is different from that indicated at K in FIG. 3 of the standard negative carrier 16, the selected clearance of the negative carrier, which is indicated at K' in FIG. 3, is read out from RAM 76. The actuation of the housing 12, etc., which will be described subsequently, is controlled depending on a preset magnification after correction of each parameter has been performed on the basis of a difference $\Delta K$ between K and K', namely, $\Delta K = K - K'$.

The housing 12 is fixed on a portion of a belt mounted on pulleys 30 and 32 and is movable up and down as viewed in FIG. 1 by subjecting the pulleys 30 and 32 to a driving force of an unillustrated motor.

The printing lens 24 is provided on a turret 38. The turret is mounted on a lift 40 axially supported on the housing 12 by means of a threaded shaft 36. The turret 38 is caused to rotate by a motor 41 mounted on the lift 40 so that another lens can be aligned with the optical axis. The lift 40 is prevented from turning. The threaded shaft 36 is caused to rotate by a driving force of a motor 43 so that the lift 40 and turret 38 simultaneously move up and down thereby enabling the position of the lens 24 to be altered.

In housing 12, a reflecting mirror 42 is arranged to permit sliding movements in a horizontal direction. In addition, a portion of the mirror 42 is mounted on a belt 44. The belt 44 is mounted on its associated pulleys 46 and 48, each of which undergoes a rotational force from an unillustrated motor so that the mirror 42 is caused to move in a left and right direction as viewed in FIG. 1, whereby the mirror 42 moves toward and away from the optical axis.

The mirror 42 reflects a light from a light source 20, transmitting it to two image sensors 56,58 via a zoom lens 52 and a beam splitter 54. Via the zoom lens 52, each negative image having a size corresponding to the frame size of the negative film is focused on the image sensors 56,58. The intensity of light at each point on the negative image is measured by scanning. Data obtained is carried to the controller 29 to calculate an exposure time.

However, in the printer 10 of the present embodiment, before processing begins, the housing 12 is positioned at two locations, one for a high magnification and the other for a low magnification. This is so that an optimum lens position and optical path length, corresponding to an AF curve, can be determined. Namely, once the position of the lens 24 has been determined, the motor 43 is driven based on the lens position and the optical path length obtained by the AF curve thereby adjusting focus.

The pitch dimension of fine focusing adjustment is stored in advance in the RAM 76 of the controller 29. Using the lens position where focusing has been established as a reference point, the lift 40 is positioned at four positions, two of which are above the original position, and the remaining two positions are below the original position. Both may be viewed in FIG. 1. The printing processing is then performed at nine positions respectively. At this time, numbers 1 to 9 are applied in order on the reverse side of a photographic paper 28 from a lower level of the lens position as viewed downwards in FIG. 1 by making use of an unillustrated printer. Each number and each lens position is controlled by the controller 29 in such a way that they can be associated with each other. The number applied as the original position is 5.

Here, an operator conducts the above-mentioned printing processing at two locations, one for the high magnification and the other for the low magnification. The optimal focusing position is then selected. The selected number applied on a photographic paper 28 is inputted to the controller 29. The AF curve is corrected by the controller 29 on the basis of the information on such a selected focusing position. The correction of the AF curve is repeated. A true AF curve can be obtained at a time when a number applied at a focusing position to be selected conforms to the print number which is applied at the original position 5.

The operation of this embodiment will next be described.

Figure 2:
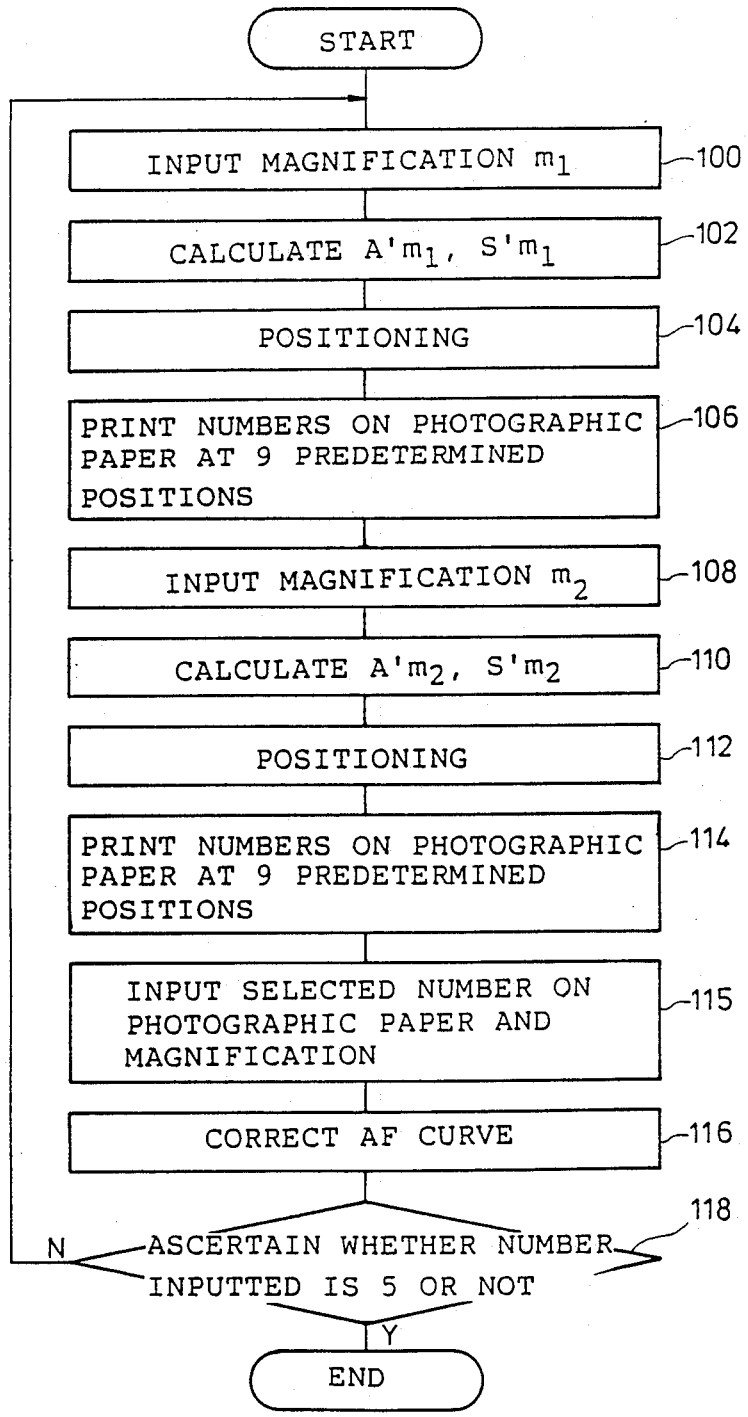
FIG. 2 is a flow chart illustrating operations during focusing adjustment.

In the present embodiment, an AF curve, which determines the lens position and the conjugate length corresponding to a predetermined magnification, is corrected prior to the printing process and it is thereafter necessary to obtain a true AF curve. The determination of the true AF curve will hereinafter be described in accordance with a flow chart shown in FIG. 2.

First of all, a high magnification $m_1$ is inputted in Step 100. In Step 102, $A'm_1$ and $S'm_1$ are determined depending on the thus-inputted magnification $m_1$ from the AF curve. The routine then advances to Step 104. The lens position and the conjugate length are changed based on the values obtained in Step 102, in order to place them in the predetermined position. Reference is now made to FIG. 1. In Step 106, the lens position is next brought to its lowest level with a distance of four times the pitch stored in advance. The printing process is then performed. The lens position is next moved upwards, as viewed in FIG. 1, to each pitch so as to conduct the printing process at the nine lens positions. Here, numbers 1 to 9 are applied on the corresponding photographic paper in order as printing proceeds.

The routine advances to Step 108. Next, a low magnification $m_2$ is inputted. In Step 110, $A'm_2$ and $S'm_2$ are determined from the AF curve depending on the magnification $m_1$ thus inputted. In Step 112, the lens position and the conjugate length are changed on the basis of the values obtained in Step 110 so as to position the lens at a predetermined place. Similar to Step 106, printing is repeated at the nine positions, Step 114. In the same manner as that described above, numbers 1 to 9 are again marked, in order of printing, on the corresponding photographic paper. Incidentally, the high and low magnifications may be inputted automatically.

In Step 115, the operator selects one sheet of optimum-focused photographic paper for the high magnification and one for the low magnification from two sets of the printed photographic papers. One set corresponds to nine sheets of printed photographic paper for the high magnification and the other set for nine sheets of printed photographic papers for the low magnification. Each number is applied on its corresponding photographic paper and its magnification are then inputted. When inputting these numbers, they may be inputted in an order determined in advance whether the print of the higher magnification or the print of the lower magnification is inputted first. As an alternative, they may be inputted along with their respective magnifications.

The routine proceeds to Step 116. An AF curve is compensated based on each lens position and the magnification which corresponds to inputted numbers. In Step 118, it is judged whether or not the . inputted number is 5, namely, whether it is the number corresponding to the original position or not. The routine advances to Step 100 if it has been judged negative and the above-described routines from Step 100 to Step 116 are then repeatedly performed. As a consequence, the next original position of the lens 24 is calculated in accordance with an AF curve compensated at that time. By repeatedly performing this calculation, the photographic paper 28, on which the actual printing exposure has been made at the original position of the lens to be calculated by the AF curve, is set to provide optimal focusing. Owing to the fact that the number inputted in Step 118 and at the same time applied on the photographic paper is indicated at 5, its original position can easily be ascertained.

When the focusing of an image printed on the photographic paper 28 at each of the original positions for both the high magnification and low magnification has been optimized, the compensated AF curve serves as a true AF curve. During a regular printing process which will hereinafter be described, the printing process can always be performed at each of the positions where the focusing has been optimized.

Referring to FIG. 4, a description will now next be made of a control routine for correcting individual parameters of the AF curve while taking into consideration differences in negative carriers.

When the negative film 18 is held by means of the negative carrier 16 and hence mounted thereon, it is first of all judged in Step 150 whether a desired magnification and a frame size of a negative film have been inputted from the keyboard 82 or not. The routine advances to Step 152. In Step 152, the negative carrier which is chosen based on the size inputted is determined, followed by Step 154 in which a judgment is made as to whether the negative carrier so determined is the standard negative carrier 16 or not. When the determined negative carrier conforms to the standard negative carrier 16, it is unnecessary to make any correction of each parameter of an AF curve. This routine is therefore led to completion. When it has been judged negative, namely, when it has been judged in Step 154 that the negative carrier does not conform with the standard negative carrier 16, the routine moves to Step 156. The clearance K' is then read out on the basis of the judged negative carrier from RAM 76. The clearance K' has been measured in advance for each individual negative carrier employed in the printer 10 of the present embodiment and has been stored in RAM 76.

The routine advances to Step 158. Here, the clearance K corresponding to the standard negative carrier 16 is read out. The difference $\Delta K$ between K and K' which is given by $\Delta K = K - K'$, is next calculated in Step 106. As shown in FIG. 3, each parameter, which varies according to positional displacements by the negative film 18, corresponds to a distance $S_P$ from a standard position of a photographic paper to a position where a negative film is arranged and a distance $A_P$ between a lens standard position and the position where the negative film is located. Each of the parameters $S_P$ and $A_P$, upon application of the standard negative film 16, is read out in Step 161. The read-out data is corrected based on the difference $\Delta K$ in Steps 164 and 166 and the routine is brought to completion.

The housing 12, etc. can be positioned on the basis of preset magnifications, using an AF curve in addition to variations in positions of the negative film 18 which occur due to differences in sizes of each of the negative carriers.

The operation of a normal printing process will next be described.

A light emitted from the light source 20 is diffused by the light diffusion barrel 22, followed by illumination of a negative film 18. The light, which passes through the negative film 18, travels through an opening in the turret 38 and is then reflected by the mirror 42 in a horizontal direction. The reflected light passes through the zoom lens 52 and the is divided into two parts by means of the beam splitter 54. These two light parts pass to their corresponding image sensors 56 and 58. And, a negative image of a size corresponding to the frame size of the negative film is focused on each of the image sensors 56 and 58, so by the zoom lens that the intensity of light at each point on the negative image is measured by scanning.

The density of each point on the negative image is measured by the image sensors 56 and 58 and a printing exposure is calculated on the basis of the density thus measured.

When printing, the turret 38 is caused to turn by a motor 41 so that the lens 24 corresponding to a printing magnification is fit on an optical axis. At the same time, the mirror 42 is moved in a right-hand direction as viewed in FIG. 1, and similarly retracts from the optical axis, for printing. At this time, a shutter 26 is opened for a period of time corresponding to the printing exposure and the image on the negative film is hence exposed onto the photographic paper 28.

When it is desired to change the printing magnification, the operator controls an unillustrated command key for entering information on the printing magnification. Using an AF curve, the lens position and the conjugate length are calculated in accordance with the printing magnification thus specified. The threaded shaft 36 is then turned, to move the turret 38 up and down. At the same time, the housing 12 is moved up and down to a predetermined level by the belt 34, so that each position of the negative film 18 and the housing 12 varies correspondingly. The conjugate length for printing is thereby changed.

Incidentally, although the distance to the negative film 18 is stored relative to the lower face 16A of the negative carrier 16 as a standard plane in the above embodiment, the standard plane may be at any part of the main body of the apparatus provided that the position of that part does not vary. In addition, although the clearance K' is stored in RAM 76 as is the case in the present embodiment, the difference ΔK may be stored. In such a case, for example, when the standard negative carrier 16 itself is replaced by a new one, it is necessary to reset each difference ΔK.

Further, the selection of the negative carrier is conducted by inputting the size of the negative film 18 on the keyboard in the present embodiment. The negative carrier can, however, be selected automatically at a time when being mounted, provided that a bar code or something similar is applied on the negative carrier and that there is a bar code reader where the negative carrier is mounted.

What is claimed is:

1. An autofocusing apparatus suitable for use in an upright printer of the type in which upon changing the enlargement, a conjugate length is altered by changing the position of an original film, and a lens for printing is moved, said printer permitting mounting of a plurality of carriers adapted to hold original films of different sizes thereon respectively and being capable of setting a focusing position on the basis of an AF curve determined when a standard carrier out of said plurality of carriers is mounted, comprising:
    means for setting compensation values for individual carriers, respectively, said compensation values being commensurate with differences between the position of the original film upon mounting of the standard carrier and those of the original film upon mounting of the individual carriers having difference thicknesses other than the standard carrier;
    means for identifying the mounted carrier; and
    means for compensating the AF curve on the basis of a compensation value corresponding to the carrier specified by the identifying means.

2. An apparatus as claimed in claim 1, wherein said setting means has a means for storing a clearance K between a predetermined standard plane and an imaginary plane of the original film mounted on the standard carrier and a clearance K' between the predetermined standard plane, and an imaginary plane of the original film mounted on each of said carriers.

3. An apparatus as claimed in claim 2, wherein said setting means has a means for computing a difference ΔK between the clearance K and the clearance K'.

4. An apparatus as claimed in claim 3, wherein said compensation means compensates parameters of the AF curve based on said difference ΔK.

5. An apparatus as claimed in claim 4, wherein said identification means specifies said carriers on the basis of sizes of the original films to be printed.

6. An apparatus as claimed in claim 5, wherein said identification means has a keyboard which permits input of the size of the original film to the apparatus.

7. An apparatus as claimed in claim 4, wherein the carriers are individually identified by different bar codes and said identification means has at least one bar code reader which permits reading of the bar codes.

8. An autofocusing apparatus suitable for use in an upright printer, which is provided with a movable table permitting selective mounting of a plurality of carriers adapted to hold original films of different sizes thereon respectively, said movable table being movable along an optical axis for printing relative to a photographic paper and at least one printing lens supported on the movable table and capable of moving along the optical axis for printing relative to said each carrier, said printer permitting alteration of a conjugate length by moving the movable table relative to the photographic paper and also allowing movement of the printing lens relative to said carrier upon changing the enlargement and being capable of setting a focusing position on the basis of an AF curve determined when a standard carrier from among the plurality of carriers is mounted on the movable table, comprising:
    means for setting compensation values for individual carriers having different thicknesses respectively, said compensation values being commensurate with differences between the position of the original film upon mounting of the standard carrier on the movable table and that of the original film upon mounting of another carrier on the movable table;
    means for identifying the carrier mounted on the movable table; and
    means for compensating the AF curve on the basis of a compensation value corresponding to the carrier specified by the identifying means.

9. An apparatus as claimed in claim 8, wherein said setting means has a means for storing the clearance K between the level of mounting of the standard carrier on the movable table and that of the original film mounted on the standard carrier as well as the clearance K' between the level of mounting of said another carrier on the movable table and that of the original film mounted on said another carrier.

10. An apparatus as claimed in claim 9, wherein said setting means has a means for computing a difference ΔK between the clearance K and the clearance K'.

11. An apparatus as claimed in claim 10, wherein said compensation means compensates parameters of the AF curve based on said difference ΔK.

12. An apparatus as claimed in claim 11, wherein said identification means specifies said carriers on the basis of sizes of the original films to be printed.

13. An apparatus as claimed in claim 12, wherein said identification means has a keyboard which permits input of the size of the original film to the apparatus.

14. An apparatus as claimed in claim 11, wherein the carriers are applied with different bar codes respectively and said identification means has at least one bar code reader which permits reading of the bar codes.

* * * * *